(12) United States Patent
Deacon et al.

(10) Patent No.: US 10,260,825 B2
(45) Date of Patent: *Apr. 16, 2019

(54) HEAT EXCHANGE SYSTEM AND METHOD

(71) Applicant: Advanced Steam Technology Company LLC, Brookfield, WI (US)

(72) Inventors: Walter T. Deacon, West Lafayette, IN (US); Timothy James Parbs, New Berlin, WI (US)

(73) Assignee: Advanced Steam Technology, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,908

(22) Filed: Aug. 4, 2017

(65) Prior Publication Data

US 2018/0128559 A1    May 10, 2018

Related U.S. Application Data

(60) Continuation of application No. 13/963,158, filed on Aug. 9, 2013, now Pat. No. 9,726,443, which is a
(Continued)

(51) Int. Cl.

| | |
|---|---|
| *F22D 1/00* | (2006.01) |
| *F28F 27/02* | (2006.01) |
| *F24D 17/00* | (2006.01) |
| *F28B 1/02* | (2006.01) |
| *F28D 7/16* | (2006.01) |

(Continued)

(52) U.S. Cl.
CPC .......... *F28F 27/02* (2013.01); *F24D 17/0078* (2013.01); *F28B 1/02* (2013.01); *F28D 7/16* (2013.01); *F28D 9/0006* (2013.01); *F28D 20/0034* (2013.01); *F24D 3/082* (2013.01);
(Continued)

(58) Field of Classification Search
CPC ........ F24D 3/08; F24D 3/082; F24D 17/0078; F28F 27/02; F28F 2250/06; F28D 7/16; F28D 9/006; F28D 20/0034; F28B 1/02
See application file for complete search history.

(56) References Cited

U.S. PATENT DOCUMENTS

| | | | |
|---|---|---|---|
| 1,312,416 A | 8/1919 | Morterud | 165/108 |
| 2,248,734 A | 7/1941 | Barr | 518/706 |

(Continued)

*Primary Examiner* — Kevin Lee
*Assistant Examiner* — P. Macade Nichols
(74) *Attorney, Agent, or Firm* — Niro McAndrews, LLP

(57) ABSTRACT

A dual fluid heat exchange system is presented that provides a stable output temperature for a heated fluid while minimizing the output temperature of a cooled fluid. The heated and cooled fluids are brought into thermal contact with each other within a tank. The output temperature of the warmed fluid is maintained at a stable temperature by a re-circulation loop that connects directly to the mid portion of the tank such that the re-circulated fluid flow primarily warms only a re-circulation section of the tank. The other, lower flow rate, section of the tank may be positioned so that it has a cooler temperature and thus serves to increase the efficiency of the heat exchange by extracting extra heat energy out of the cooled fluid before it leaves the tank. Alternatively, the low flow rate section of the tank may be warmer than the re-circulated section, and thus allow the re-circulated section to be cooler than the output temperature of the warmed fluid.

19 Claims, 18 Drawing Sheets

Related U.S. Application Data division of application No. 12/395,173, filed on Feb. 27, 2009, now Pat. No. 8,528,503.

(51) Int. Cl.
 F28D 9/00 (2006.01)
 F28D 20/00 (2006.01)
 F24D 3/08 (2006.01)

(52) U.S. Cl.
 CPC ......... *F28F 2250/06* (2013.01); *Y02E 60/142* (2013.01)

(56) References Cited

U.S. PATENT DOCUMENTS

| | | | |
|---|---|---|---|
| 2,255,126 A | 9/1941 | Whalley | 518/712 |
| 2,256,622 A | 9/1941 | Murphree | 518/706 |
| 2,353,600 A | 7/1944 | Sweetser | 518/712 |
| 2,475,025 A | 7/1949 | Huff | 518/712 |
| 2,723,109 A | 11/1955 | Alton | 165/302 |
| 2,740,803 A | 4/1956 | Oskar | 518/712 |
| 3,590,912 A | 7/1971 | Elder | 165/302 |
| 3,672,444 A * | 6/1972 | Lowe | F24D 3/082 122/32 |
| 3,779,306 A | 12/1973 | Wilson | 165/297 |
| 3,807,963 A | 4/1974 | Smith | 422/197 |
| 3,828,567 A | 8/1974 | Chittenango | 62/160 |
| 4,057,103 A | 11/1977 | Tratz | 165/11.1 |
| 4,060,124 A | 11/1977 | Tratz | 165/110 |
| 4,403,650 A | 9/1983 | Klaren | 165/104.16 |
| 4,765,398 A | 8/1988 | Tsao | 165/110 |
| 4,899,545 A | 2/1990 | Kalina | 60/673 |
| 4,919,541 A | 4/1990 | Grosz-roell | 366/136 |
| 5,898,818 A | 4/1999 | Chen | 392/449 |
| 6,115,542 A | 9/2000 | Nir | 392/449 |
| 6,857,467 B2 | 2/2005 | Lach | 165/110 |
| 9,726,443 B2 * | 8/2017 | Parbs | F28F 27/02 |

\* cited by examiner

HEAT EXCHANGE SYSTEM AND METHOD

CROSS-REFERENCE TO CO-PENDING APPLICATION

This application is divisional of, and claims priority to, co-pending U.S. patent application Ser. No. 12/395,173 entitled "Heat Exchange System and Method" that was filed on Feb. 27, 2009 by Walter Deacon and Timothy Parbs, the contents of which are herein incorporated by reference.

FIELD OF THE INVENTION

The present invention relates to heat exchange systems, and more particularly to a heat exchange system and method by which a first fluid is efficiently warmed to a consistent temperature by a second fluid.

BACKGROUND OF THE INVENTION

Heat exchange systems have been used for different purposes, such as warming water used for domestic, commercial, or industrial purposes. Designers of heat exchange systems have faced many challenges such as limitations on the size of the heat exchanger. Additionally, there is a need for the warmed fluid to exit the system at a consistent temperature. Managing the temperature of the cooled fluid leaving the system is also a challenge facing heat exchange systems due to efficiency and regulatory concerns.

Changes in the demand for heating require that heat exchange systems be able to provide vastly different amounts of heating, which can lead to substantial temperature changes in the output of the warmed fluid. Conventional methods of stabilizing the output temperature of the warmed fluid often rely on adjusting the flow rate of the fluid to be cooled. Although this approach may reduce the variability of the warmed fluid output temperature, the cooled fluid temperature leaving the heat exchanger can vary drastically.

Conventional systems used to heat water often have two fluid circuits. Typically water to be heated circulates in the first fluid circuit in a liquid state while steam circulates in the second fluid circuit at temperatures that are often above the boiling point of water. Both circuits meet at a heat exchanger unit where the cool water is warmed by flowing over thermally conductive conduits containing the high temperature steam. The water exits the heat exchanger in a heated state, and if the demand for hot water increases, the flow rate of the hot water vapor is simply increased.

In conventional systems, the temperature of the heated water at the outlet varies based on the outgoing water flow rate variations and/or according to incoming water temperature variations. As a result of the variable flow rate through the heat exchanger, the quantity of energy transmitted cannot be precisely controlled causing the temperature of the output water to vary. Additionally, the high temperature of the steam limits control, but is needed for high usage situations. In low usage situations, the steam will often warm the water up to a temperature beyond that which is desired.

A varying output temperature of the cooled fluid from the heat exchanger can reduce the efficiency of the energy exchange since energy remaining in the cooled fluid is often wasted. There are also many instances where there are requirements and regulations on the temperature of the cooled fluid leaving the heat exchanger. In systems where the cooled fluid is not returned to its source for reheating, the cooled fluid is often dumped into a sewer system or waterway. In addition to being inefficient, dumped fluids often must be below a specified temperature to avoid damaging sewer systems or to avoid causing thermal pollution that can lead to problems such as algae blooms.

In addition to the other problems associated with heat exchangers, floor space is often at a premium in modern mechanical rooms so it is desirable to have a heat exchanger with a minimal footprint. The cost difference in using a system with a small 1.75 square yard footprint versus having to stack multiple regular horizontal exchangers can be thousands of dollars. Thus, it is desirable to provide a vertically oriented heated exchanger with a minimal footprint. Additionally, retrofit applications require heat exchangers to be placed in small areas. Large, bulky 40 to 50 year old exchangers may be at the end of their useful life. Many times a facility is built up around these failing units and replacing them with a similarly sized unit would entail major demolition. Vertical exchangers can be wheeled through a doorway and they can be piped up with the existing unit in place, causing minimal downtime. Sometimes the existing unit is encapsulated and left in place.

Attempts have been made to solve some of these problems, such as in U.S. Pat. No. 6,857,467 issued to Lach, the contents of which are herein incorporated by reference. The Lach patent claims to disclose a "heat exchange system . . . used for heating a first fluid with a second fluid [using] . . . a flooded heat exchanger . . . capable of being flooded in a determined proportion [and] . . . includes a second fluid circuit control valve . . . for controlling the flow rate of the second fluid . . . whereby the proportion of the heat exchanger which is flooded . . . can be selectively calibrated. The heat exchange system also includes a first fluid pre-heating device . . . for partly pre-heating the first fluid before it is heated by the second fluid, whereby the first fluid temperature at the first fluid circuit downstream end will be stabilized." Although the Lach patent attempts to improve the temperature stability of a first fluid leaving the heat exchanger, the Lach patent fails to provide a mechanism for stabilizing and reducing the output temperature of the cooled fluid.

Semi-instantaneous water heaters attempt to stabilize the output temperature of water heaters by having small mixing tanks in which water delivered from the heat exchanger is blended with water in the vessel. U.S. Pat. No. 4,278,069 issued to Clark discloses an example of a semi-instantaneous water heater, the contents of which are herein incorporated by reference. While it is possible to obtain temperature control of the warmed fluid in semi-instantaneous water heaters, the output temperature of the cooled fluid is uncontrolled.

Although designs by Lach and Clark have attempted to solve some of the problems associated with heat exchangers, all of these problems have yet to be fully addressed. Objects of the present invention include providing a fluid heater with a low installation cost, providing a more efficient heat transfer from steam, providing a heat exchanger that requires less physical space, providing a heat exchanger that does not require a condensate pump, a vacuum breaker, or a pressure regulating valve station, controlling the temperature of the liquid leaving the heat exchanger within ±3° F., and decreasing the temperature of the steam condensate leaving the heat exchanger.

SUMMARY OF THE INVENTION

A dual fluid heat exchange system is presented that provides a stable output temperature for a heated fluid while also minimizing the output temperature of a cooled fluid.

The heated and cooled fluids are brought into thermal contact with each other in a tank. The output temperature of the warmed fluid is maintained at a stable temperature by a re-circulation loop that connects directly to a mid portion of the tank such that the re-circulated fluid flow primarily warms only a re-circulation section of the tank. The other, lower flow rate, section of the tank may be positioned so that it has a cooler temperature and thus serves to increase the efficiency of the heat exchanger by extracting extra heat energy out of the cooled fluid before it leaves the tank. Alternatively, the low flow rate section of the tank may be warmer than the re-circulated section, and thus allow the re-circulated section to be cooler than the final output temperature of the warmed fluid.

The cooled fluid may be condensed in a controlled manner from a vapor form to a liquid within the tank in order to release energy to heat the warmed fluid. A control valve downstream of the tank may be used to adjust the condensate flow rate out of the tank in order to control the relative proportion of vapor to condensate.

The two warmed fluid sections of the tank may be structured so that there is no barrier between them, or there may be a separator to reduce unintended mixing between the sections. The structure of the tank for bringing the warmed and cooled fluids into thermal contact may include a plurality of vertical thermally-conductive pipes and a plurality of horizontal plates.

The foregoing summary does not limit the invention, which is defined by the attached claims. Similarly, neither the Title nor the Abstract is to be taken as limiting in any way the scope of the disclosed invention.

BRIEF DESCRIPTION OF THE DRAWINGS

Each of the drawing figures now described shows an exemplary embodiment of the present invention.

DETAILED DESCRIPTION OF THE PREFERRED EMBODIMENTS

The present invention may be used with any type of heat exchanger and is particularly suited for use with domestic hot water systems, ammonia based refrigeration systems, heating water/glycol building heat systems, oil or heat transfer fluid systems, wash stations, and emergency showers. However, for descriptive purposes, the present invention will be described in use with a heat exchanger heating water with hot steam.

Figure 1:
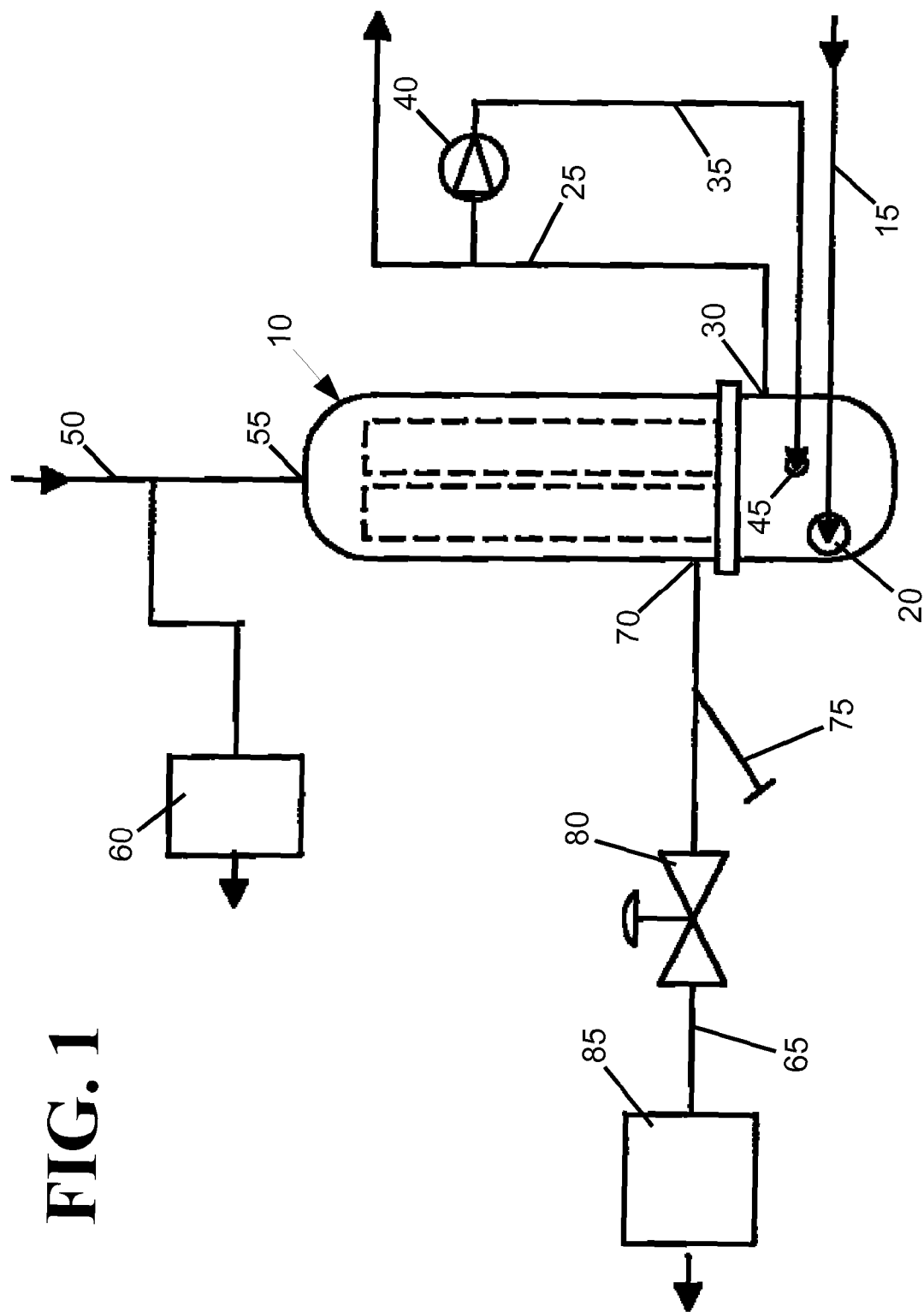
FIG. 1 is a schematic view of a heat exchange system with a re-circulation circuit.

FIG. 1 shows a circuit diagram of a heat exchange system with a heat exchange tank 10. A water circuit connecting to the heat exchange tank has a water input line 15 for inputting cool water into the tank at a cool water input 20 on the tank, and a water output line 25 withdrawing heated water from a hot water outlet 30 on the tank. A stabilization circuit with a re-circulation line 35 and a re-circulation pump 40 diverts a portion of the heated water leaving the tank back into the tank at a re-circulated water inlet 45 to stabilize the temperature of the water leaving the tank. The re-circulation pump may be a variable speed pump so that the flow rate through the recirculation line may be adjusted based on the temperature of the water in the tank and/or the flow rate of water into and out of the system.

A vapor circuit includes a steam input line 50 that provides hot steam to the heat exchange tank 10 at a steam inlet 55 on the tank. A drip trap 60 may be connected to the steam input line to remove condensation from the steam line. Within the tank, the steam is placed in thermal communication with the water from the water input line. Since the steam is at a higher temperature than the water, heat is transferred from the steam to the water causing the steam to condense into a steam condensate while the water is warmed. The interface between the steam and the water may be structured in a variety of ways to facilitate heat transfer from the steam to the water. In one embodiment of the invention, the steam is confined to a plurality of vertically oriented tubes extending the height of the tank while the water to be warmed substantially surrounds each of the tubes. In another embodiment of the invention, the steam is confined to a steam conduit close to the exterior of the tank such that the conduit is only partially surrounded by water and only a portion of the conduit is structured to facilitate thermal communication between the steam and the water. In yet another embodiment of the invention, the steam in the tank is confined to a conduit having a plurality of baffles structured to increase the interior surface area of the conduit and thereby facilitate heat transfer from the steam to the water. The steam and water may progress through the tank in a co-current direction, or the steam and water may travel in a counter co-current direction such that the steam input is located near the water output and the water input is located near the condensate output.

The steam/water interface is preferably made from thermally conductive materials such as copper (380 W/mk thermal conductivity), aluminum (200 W/mk), silver, (429 W/mk), type 304, 316, or 302 stainless steel (16.2 W/mk), type 410 stainless steel (24.9 W/mk), or CoolPoly® E5101 Thermally Conductive Polyphenylene Sulfide (20 W/mk).

A condensate line 65 withdraws steam condensate via a condensate outlet 70 in the tank. A condensed steam outlet 75 may be in the condensate line to release condensate in the event of an over pressurization. A control valve 80 in the condensate line is structured to restrict the flow of condensate out of the heat exchanger tank. By limiting the flow of condensate, the steam conduit within the tank may be fully or partially flooded with steam condensate. As a result of the condensate having a greater density than the steam, the condensate will sink to the lower portions of the tank thereby forming a steam/condensate partition within the tank. The condensation of steam in the steam section releases a greater amount of heat energy into the water than the cooling of the steam condensate allowing the water near the steam to be significantly heated relative to the water near the steam condensate. By decreasing the temperature of condensate leaving the heat exchanger tank, the efficiency of the heat exchanger is increased. Downstream of the control valve 80 is a condensate trap 85 adapted to prevent the flow a steam in the event of a control valve failure. A bleed valve may be positioned near the condensate trap to release steam in the event of an unintentional vaporization.

Figure 2:
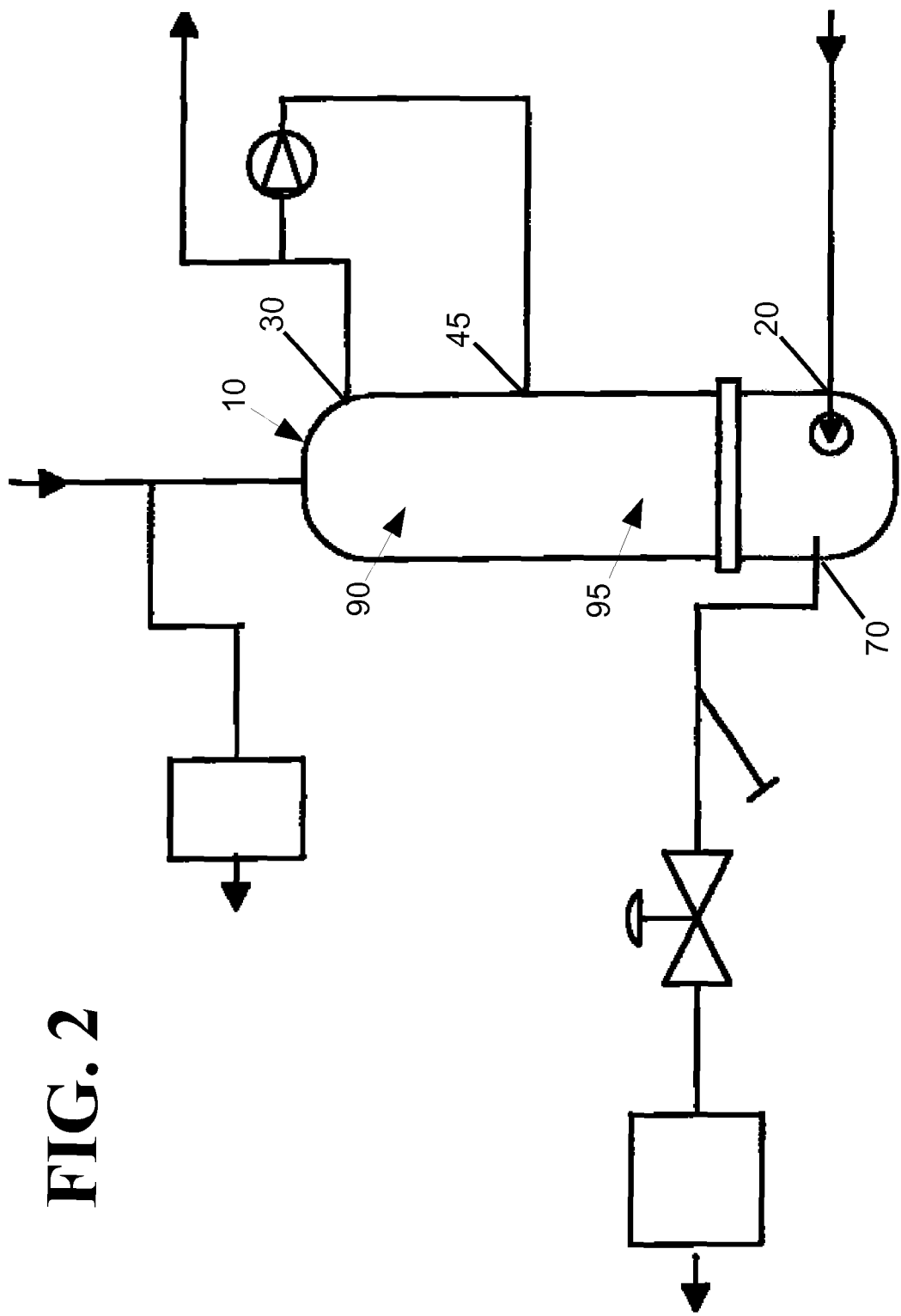
FIG. 2 is a schematic view of another heat exchange system with a re-circulation loop.

FIG. 2 illustrates a heat exchanger tank 10 where the re-circulated water input 45 is located between the hot water outlet 30 and the condensate outlet 70 such that a pre-warming section 90 within the tank is formed between the cool water inlet 20 and the re-circulated water inlet 45. In the water flow downstream of the pre-warming section, a re-circulation section 95 is located in the heat exchange tank between the re-circulation input and the hot water outlet. Within the re-circulation section, the water is exposed to hot condensate and condensing steam such that the average temperature of the water within the re-circulation section to be greater than in the pre-warming section of the tank.

In the re-circulation section of the heat exchanger tank, the water has an average flow rate that is higher than in the pre-warming section because the water in the re-circulation section is moved by both the re-circulation pump and the means that moves the water through the cool water input line, such as a water tower. The higher flow rate of the re-circulation section facilitates heat transfer from the steam by acting to reduce the likelihood that water near the steam conduit is substantially warmer than the rest of the re-circulation section. Additionally, the higher flow rate increases mixing within the re-circulation section and thereby assists in stabilizing the temperature of the water leaving the hot water output of the water heater tank. In one embodiment, the pre-warming and re-circulation sections are substantially equal in size. In other embodiments, one section may be larger than the other section. In an exemplary embodiment, the pre-warming section is between 25% and 200% the size of the re-circulation section.

In order to optimize heat transfer from the steam and condensate to the water, it is desirable to structure the tank so that the steam condensate leaves the tank at a cool temperature. Preferably, the temperature of the water in the pre-warming section should be as cold as possible while the water in the re-circulation section should be near the desired hot output temperature. Thus, the temperature gradient between the two sections should be maximized. In order to create an optimal temperature gradient, the flow of water from the pre-warming section to the re-circulation section is preferably limited to only a flow rate similar to the flow rate out of the heat exchange system. The heat exchanger tank may be structured to limit the unintentional flow rate. In one embodiment, the re-circulated water input is structured so that the re-circulated water enters the re-circulation section with a velocity that moves it away from the pre-warming section. In another embodiment, an aperture between the pre-warming section and the re-circulation section functions to limit mixing between the two sections. In yet another embodiment, the two sections have baffles that increase intra-sectional mixing, but decrease unintentional mixing between the two sections. For example, the baffles may be oriented such that the water re-circulation section flows in a continuous upward spiral.

Figure 3:
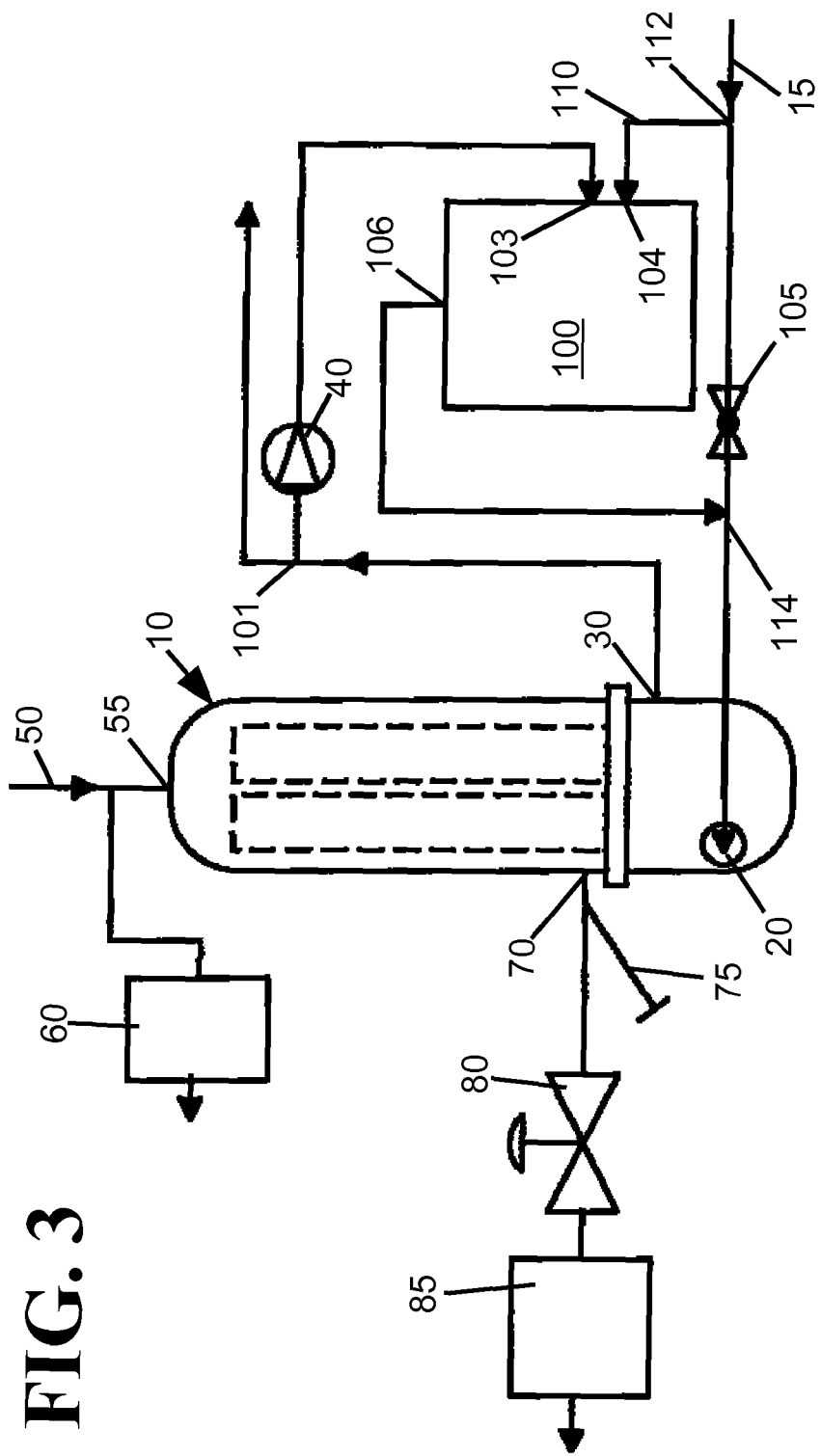
FIG. 3 is a schematic view of a heat exchange system with a re-circulation loop that includes a storage tank.

The embodiment shown in FIG. 3 includes a storage tank 100 in the re-circulation loop designed to increase the total volume of water in the loop. By storing heat energy in the storage tank from water circulated from a first recirculation inlet 101, the system is able to efficiently store energy during low usage conditions. During high usage conditions, the water in the storage tank may be directly mixed into the water input line 15 to warm the water before it enters the heat exchanger tank, or the water from the storage tank may be fed into the re-circulated water inlet of the heat exchanger tank. If the water in the storage tank is fed directly into the water input line 15, a diverter valve 105 in the line may be used to force a portion of the cool water to be fed into the storage tank through a bypass line 110 from a second recirculation inlet 112. Upon leaving the storage tank 100 the water travels to a recirculation outlet 114 and then onto the heat exchange tank 10. The diverter valve 105 is located between the second recirculation inlet and the recirculation outlet 114. In the illustrated example, the water from the first recirculation inlet 101 enters the storage tank 100 at a first tank port 103 and the water from the second recirculation inlet 112 enters at a second tank port 104. The water leaving the tank exits through a third tank port 106.

Figure 4:
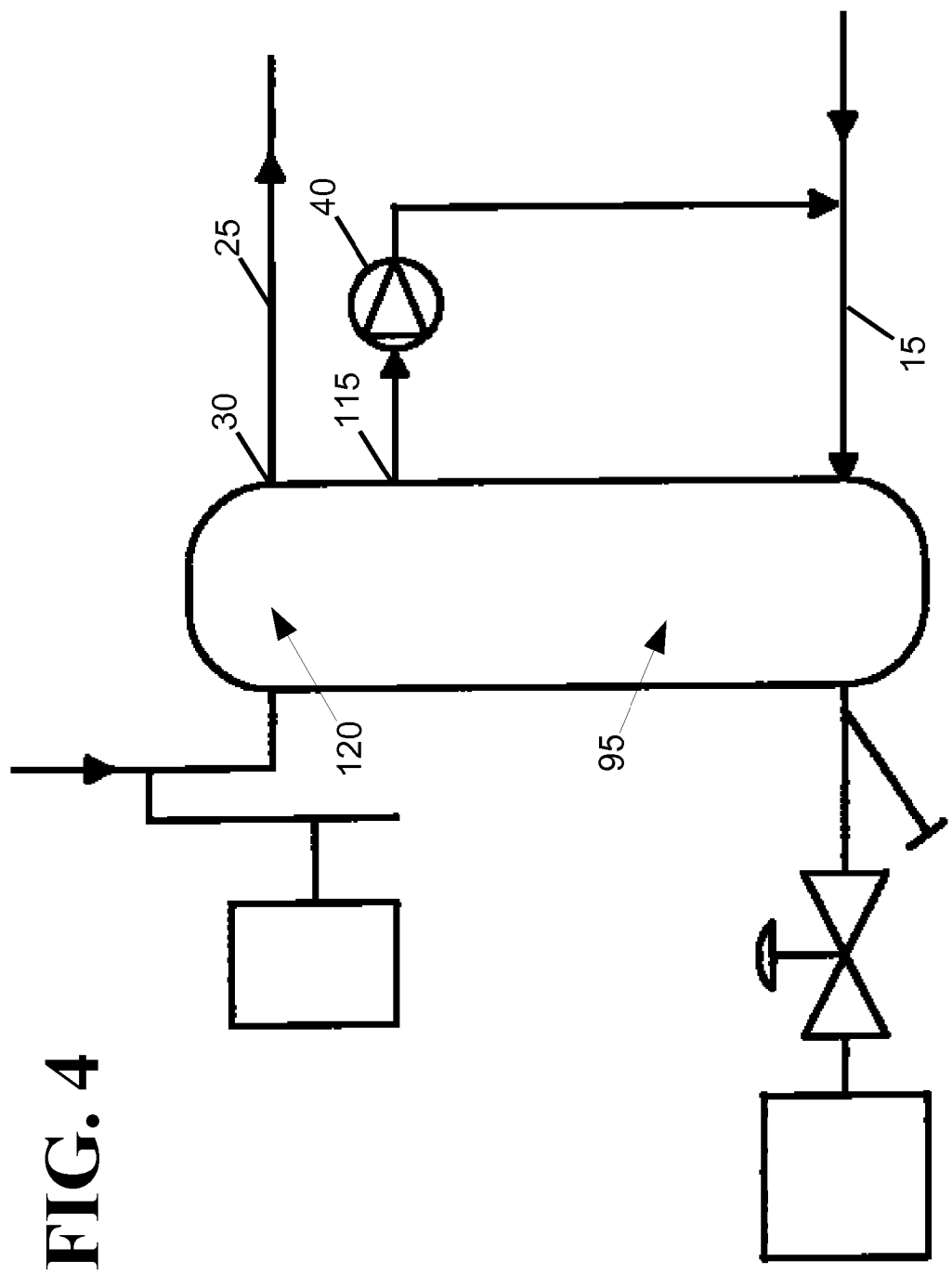
FIG. 4 is a schematic view of a heat exchange system with a re-circulation loop that draws fluid from the midsection of a tank and transfers the fluid to an inlet line.

FIG. 4 illustrates a heat exchanger tank where the water drawn by the re-circulation pump 40 is drawn from a re-circulation outlet 115 on the heat exchange tank 10 that is separate from the hot water outlet 30 on the tank. In the illustrated example, the water in the re-circulation line flows to the water input line 15, however in another embodiment, the re-circulated water is fed back into the tank via a separate re-circulated water inlet. In the system shown in FIG. 4, a re-circulation section 95 in the tank is formed between the cool water input and the re-circulation output. Located downstream of the re-circulation section is a post-warming section 120 where the water is further heated before it leaves the system through the water output line 25. Since additional heating is done before the water leaves the system, the temperature of the water in the re-circulation loop can be somewhat less than the desired temperature of the water at the output.

Figure 5:
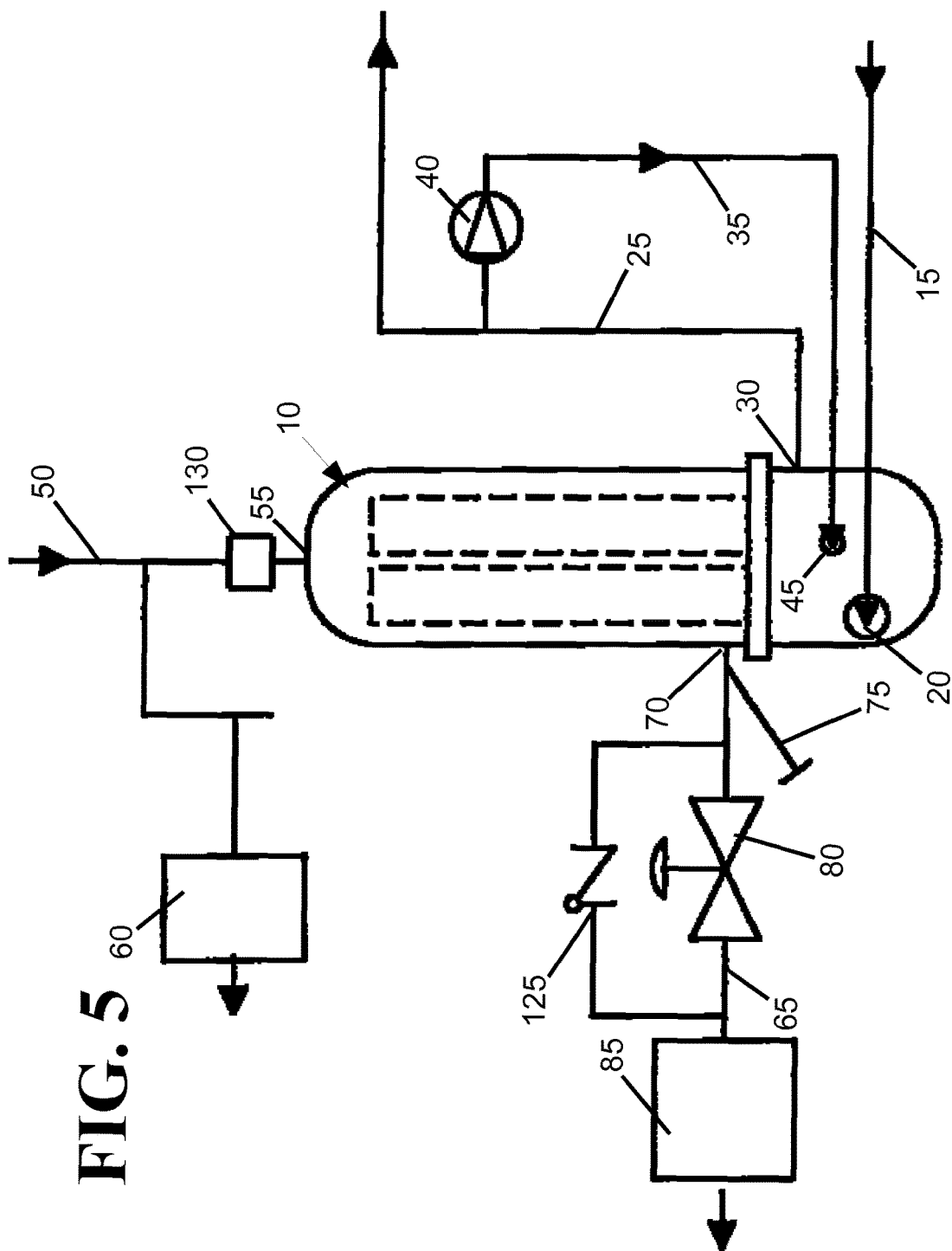
FIG. 5 is a schematic view of a heat exchange system with a re-circulation loop and a reverse flow mechanism in a condensate output line.

FIG. 5 illustrates an example of a heat exchange system having a reverse flow mechanism 125 in the condensate line 65 and a lock valve 130 in the steam input line 50 for decreasing or stopping the flow of steam into the heat exchange tank. If the proportion of condensate to steam within the heat exchanger tank is below a desired amount, the lock valve can isolate the heat exchange tank from new steam. As the steam in the tank cools and condenses, a relative vacuum will form within the steam portion of the heat exchange tank. As a result of the relative vacuum, the condensate will be drawn back into the heat exchange tank. If the condensate is warmer than the water in the heat exchange tank, additional heat energy will be transferred from the condensate to the steam and the efficiency of the heat exchange system will be further increased. The system may also include a condensate evacuation circuit (not shown) extending between the condensate line 65 and the steam input line 50 for draining condensed steam from the steam input line.

Figure 6:
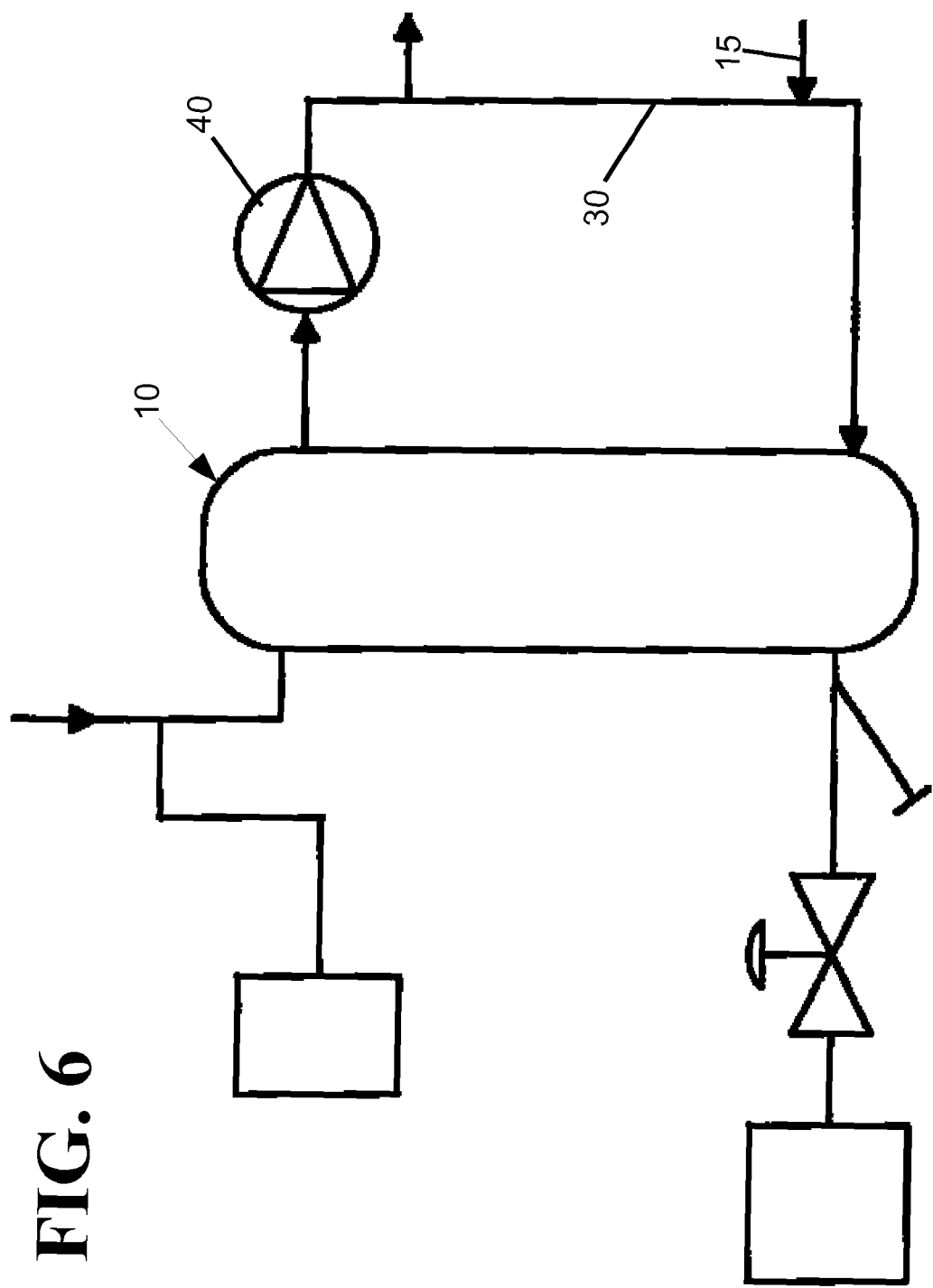
FIG. 6 is a schematic view of a heat exchange system where fluid leaves the system from a re-circulation circuit.

FIG. 6 illustrates an example of a heat exchange system where the entire hot water output of the heat exchange tank 10 travels through the re-circulation pump 40. The heated water output from the system is drawn directly from the re-circulation line 35 while the water input line 15 also feeds directly into the re-circulation line. In this design, the re-circulation section occupies substantially the entire heat exchange tank. Due to the amount of mixing between the re-circulated water and water from the input line, the system configuration of FIG. 6 provides heated water with an exceptionally consistent temperature. The configuration of FIG. 6 is also able to maintain a consistent water temperature during bursts of extremely high water usage.

Figure 7:
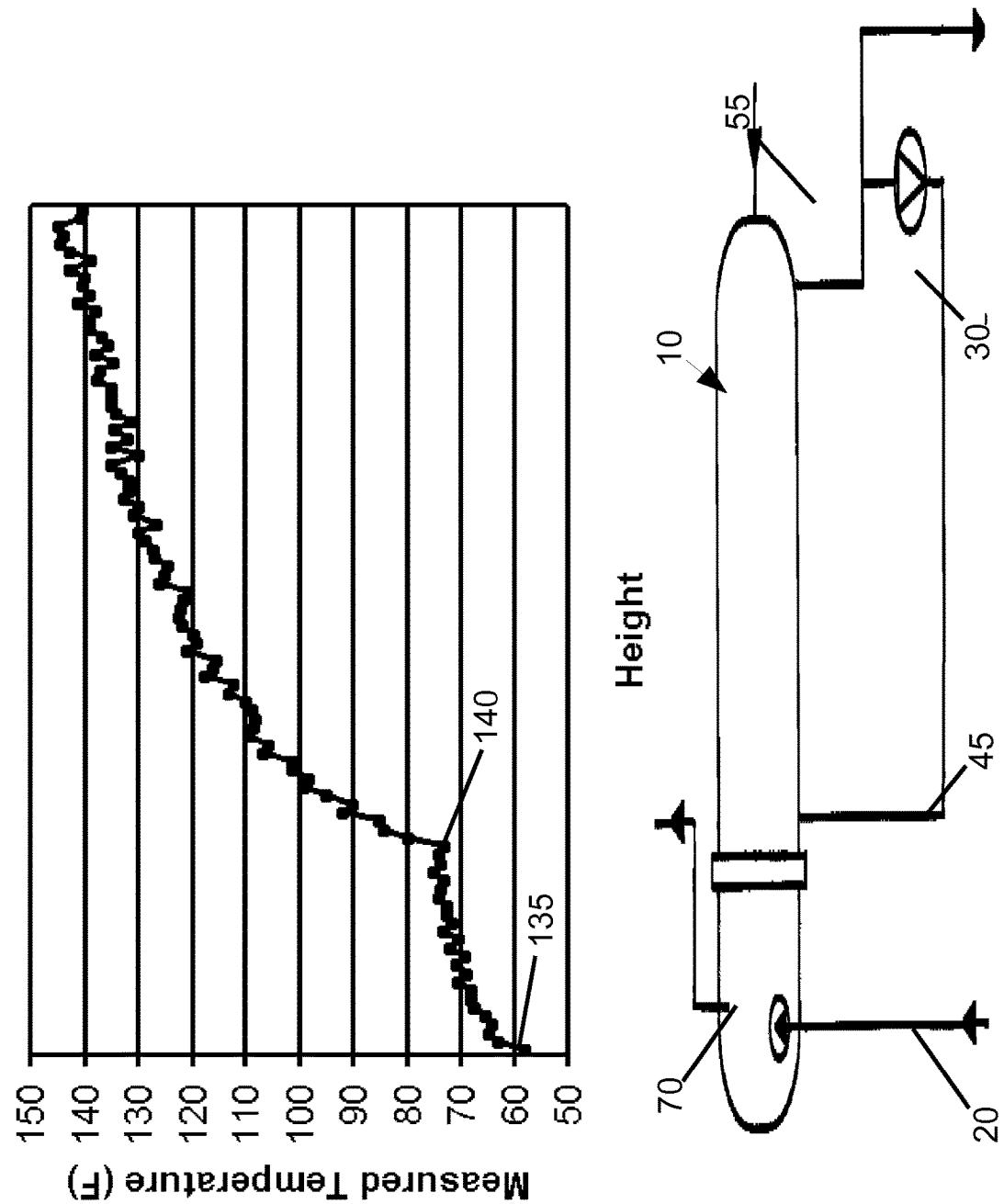
FIG. 7 is a graphic representation of a high flow fluid temperature gradient within a heat exchanger tank having a re-circulation loop.

FIG. 7 shows a representative graph of the water temperature within the heat exchanger tank 10 of FIG. 2 relative to the water's location within the tank during a high usage (100 gallons per minute) condition. When the water enters the tank it has a relatively low temperature 135 that increases as the water absorbs heat from the steam condensate as it moves through the pre-warming section. The low temperature of the water allows the condensate temperature to also be low which increases the efficiency of the heat transfer within the tank. At or near the pre-warming/re-circulation section divide 140, the temperature of the water jumps as it is mixed with hot re-circulated water. Once the water enters the re-circulation section, its flow rate increases and its temperature increase as it absorbs heat energy from the condensing steam and/or the steam condensate.

Figure 8:
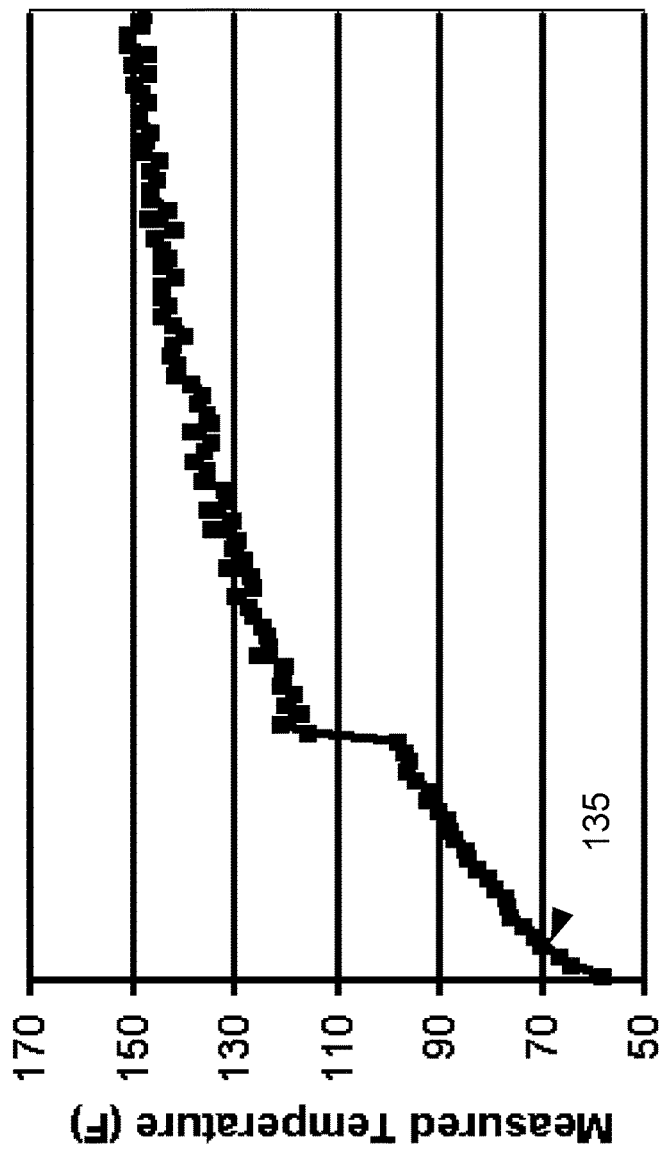
FIG. 8 is a graphic representation of a low flow fluid temperature gradient within a heat exchanger tank having a re-circulation loop.
Figure 8:
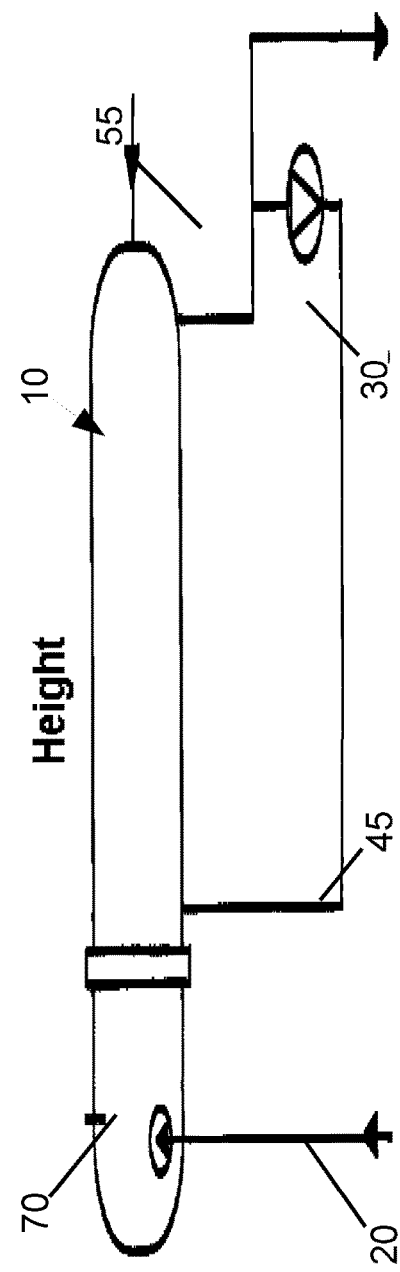

FIG. 8 shows a representative graph of the water temperature within the heat exchanger tank 10 of FIG. 2 relative to the water's location within the tank during a low usage (2 gallons per minute) condition. When water enters the tank it has a relatively low temperature 135 that increases as the water absorbs heat from the steam condensate moving through the pre-warming section. Since the water has a greater exposure time in the pre-warming section relative to the high flow conditions, the amount of heat energy absorbed from the steam condensate is greater. As the water enters the re-circulation section of the heat exchanger, the temperature again jumps as it mixes with the re-circulated water. In the re-circulation section, the rate at which the temperature of the water increases relative to its position is less than in the high flow rates due to less of a temperature gradient between the steam/steam condensate and the water.

Figure 9:
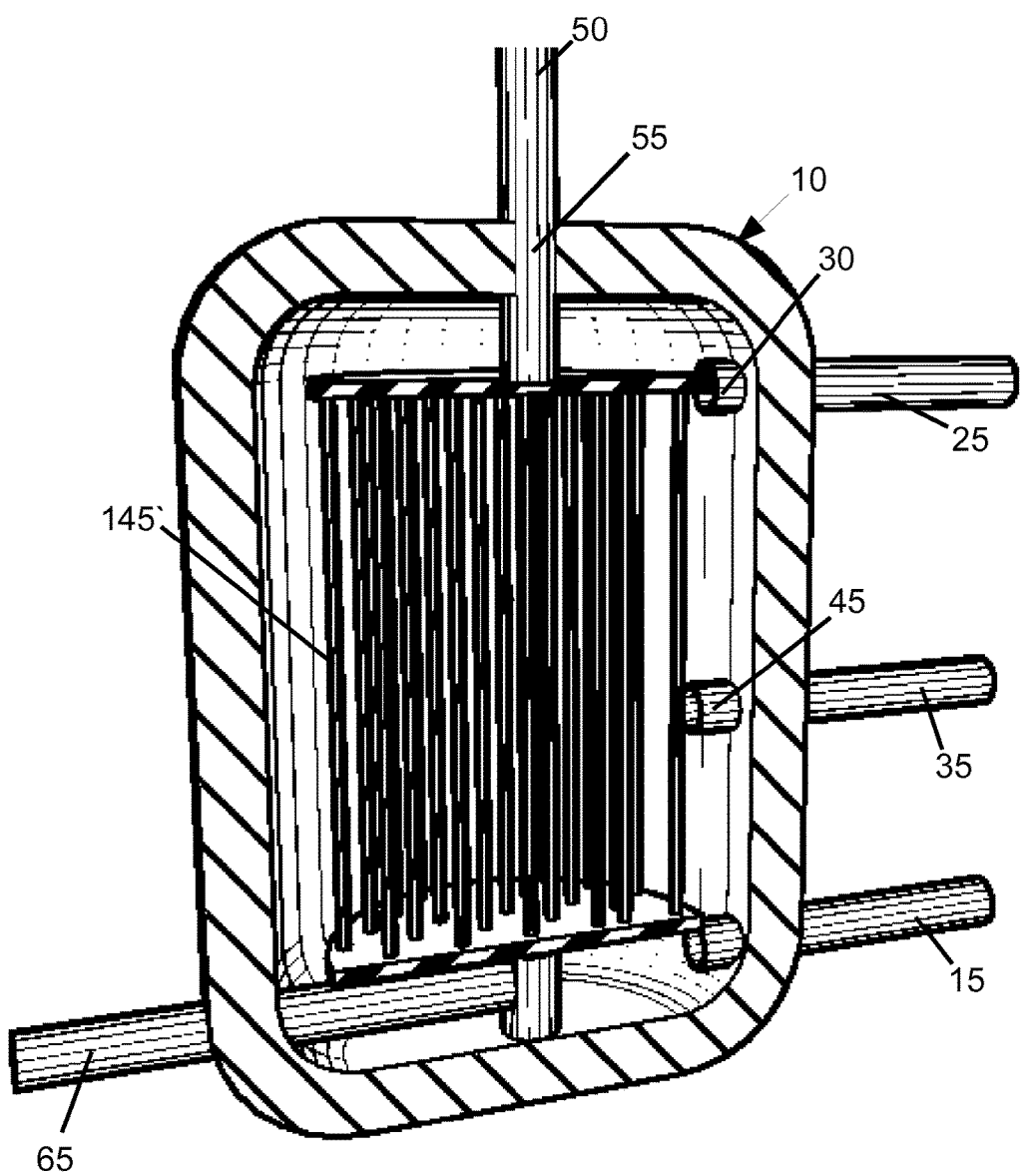
FIG. 9 is a cross-sectional view of a heat exchange tank having a plurality of vapor-vapor condensate containing pipes extending between a vapor inlet and a vapor condensate outlet.
Figure 10:
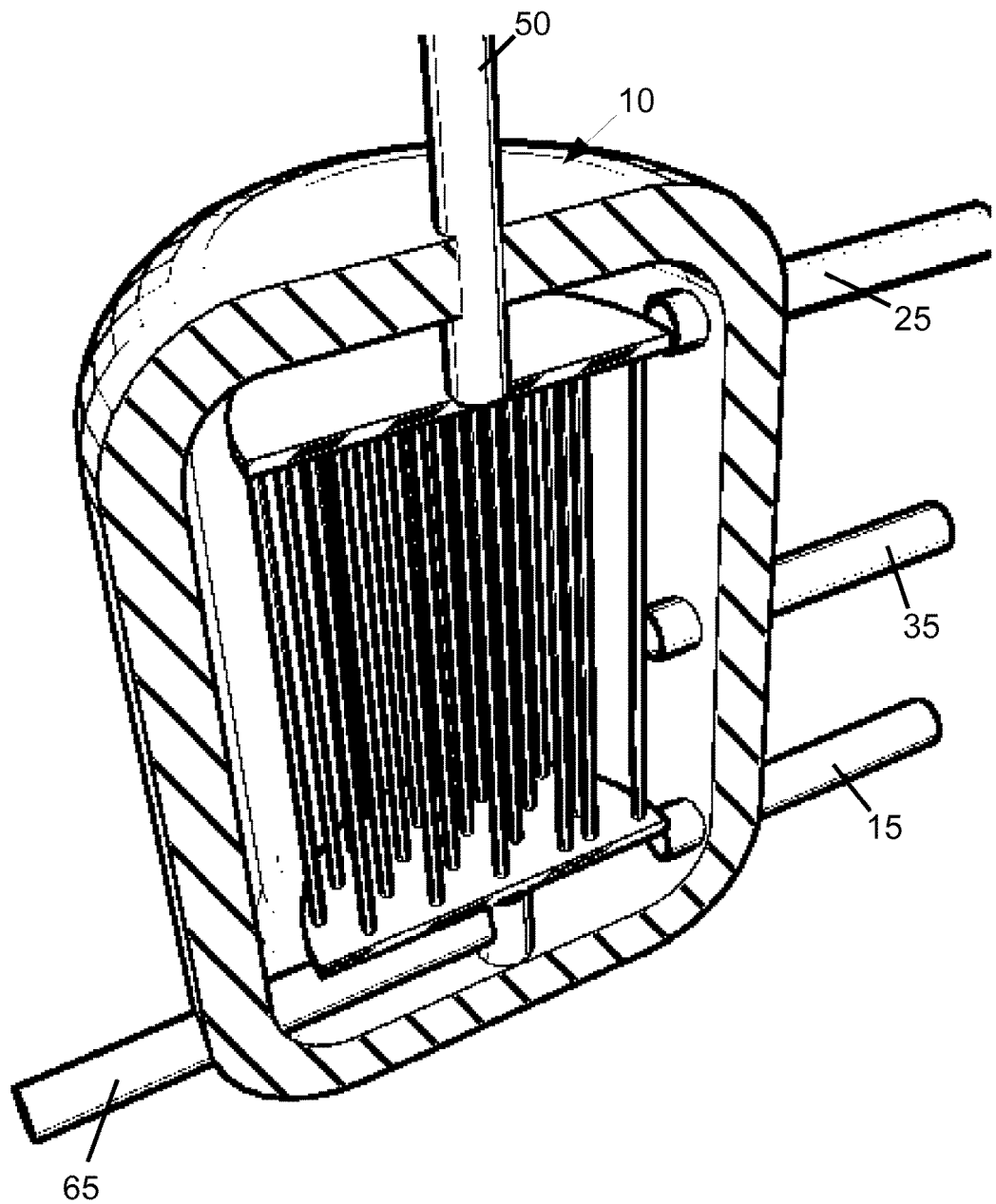
FIG. 10 is another cross-sectional view of a heat exchange tank having a plurality of vapor-vapor condensate containing pipes extending between a vapor inlet and a vapor condensate outlet.

FIGS. 9 and 10 show perspective cross-sectional views of the interior of a heat exchanger tank 10 with a steam inlet 55, a condensate outlet 70, and a re-circulated water inlet 45. The tank connects to a water input line 15, a water output line 25, a re-circulation line 35, a steam input line 50, and a condensate line 65. Within the tank are a plurality of floodable steam pipes 145, or conduits, extending between the steam inlet and the condensate outlet. The illustrated pipes have small diameters relative to the tank so that the pipes have a high surface area to interior volume ratio that facilitates the transfer of heat energy from the steam or steam condensate. Additionally, the pipes are spaced apart so that the water may easily flow within the tank in order to minimize the occurrence of local water hot spots. In the illustrated example the pipes are substantially straight, however in other embodiments the pipes may be curved so as to increase the path length that the steam/steam condensate must travel from the steam inlet to the condensate outlet. In the illustrated example, the pipes are substantially uniform in their diameter, however in other examples the diameter of the pipes may be larger closer to the condensate outlet such that the condensate has a longer period of time to be cooled by the water from the water input line.

In the example illustrated in FIGS. 9 and 10, the water flowing through the water input line 15 has a temperature of 65° F. and a flow rate of 1 GPM. The water leaving the heat exchanger tank through the water output line 25 has a temperature of 140° F. and a flow rate of 3 GPM. The water entering the heat exchanger tank through the re-circulation line 35 has a flow rate of 2 GPM and the temperature of the water close to the re-circulated water inlet has a temperature of 120° F. The temperature of the steam entering the tank through the steam input line is 300° F., and the condensate leaving the tank has an average temperature of 100° F. The in the illustrated example, the average density of the water within the re-circulation section is 0.98803 g/mL while the average density of the water within the pre-warming section is 0.99821 g/mL such that the water in the re-circulation section floats on the water in the pre-warming section.

Figure 11:
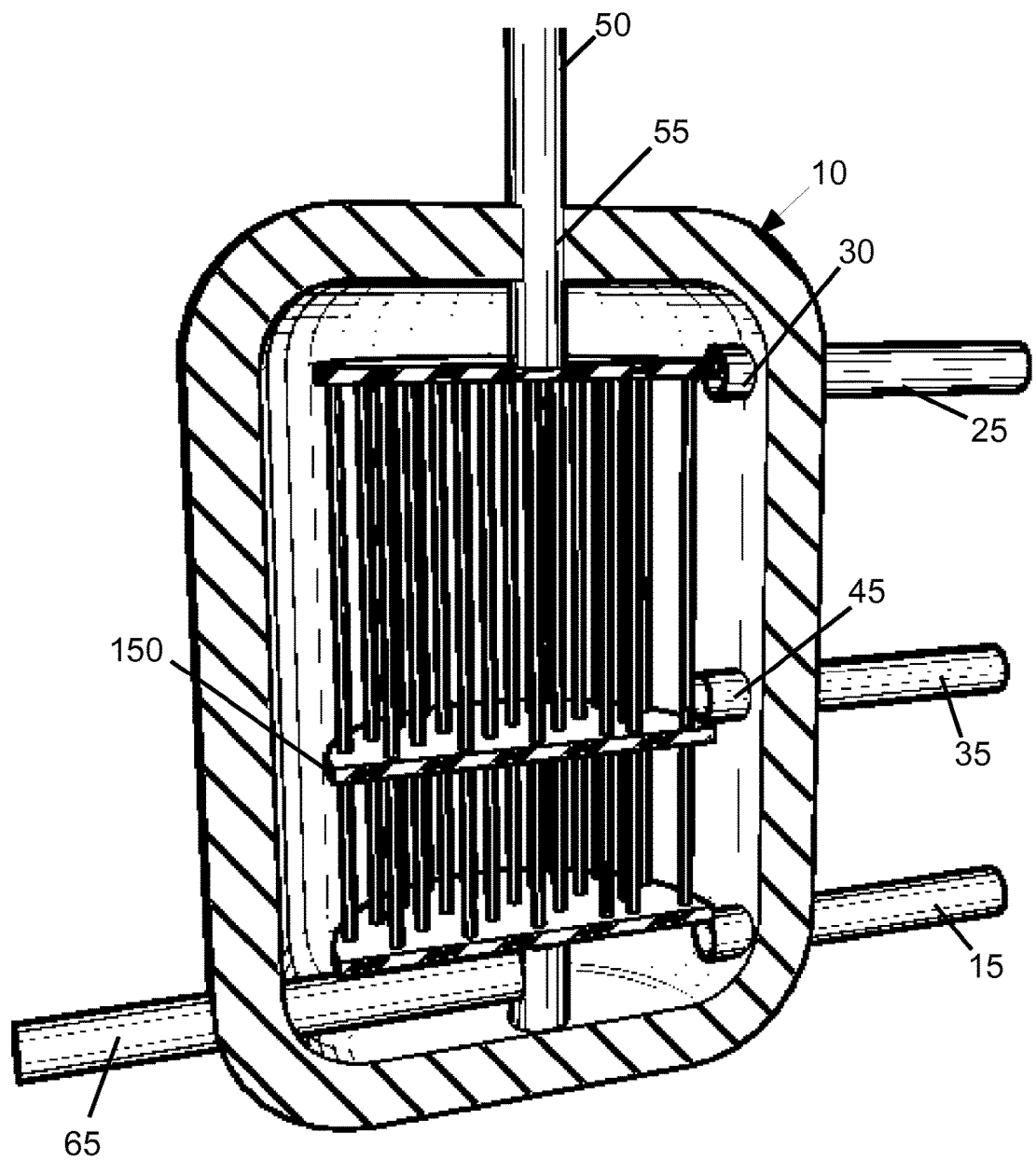
FIG. 11 is a cross-sectional view of a heat exchange tank having a plurality of vapor-vapor condensate containing pipes and a divider between a pre-warming section and a re-circulation section.
Figure 12:
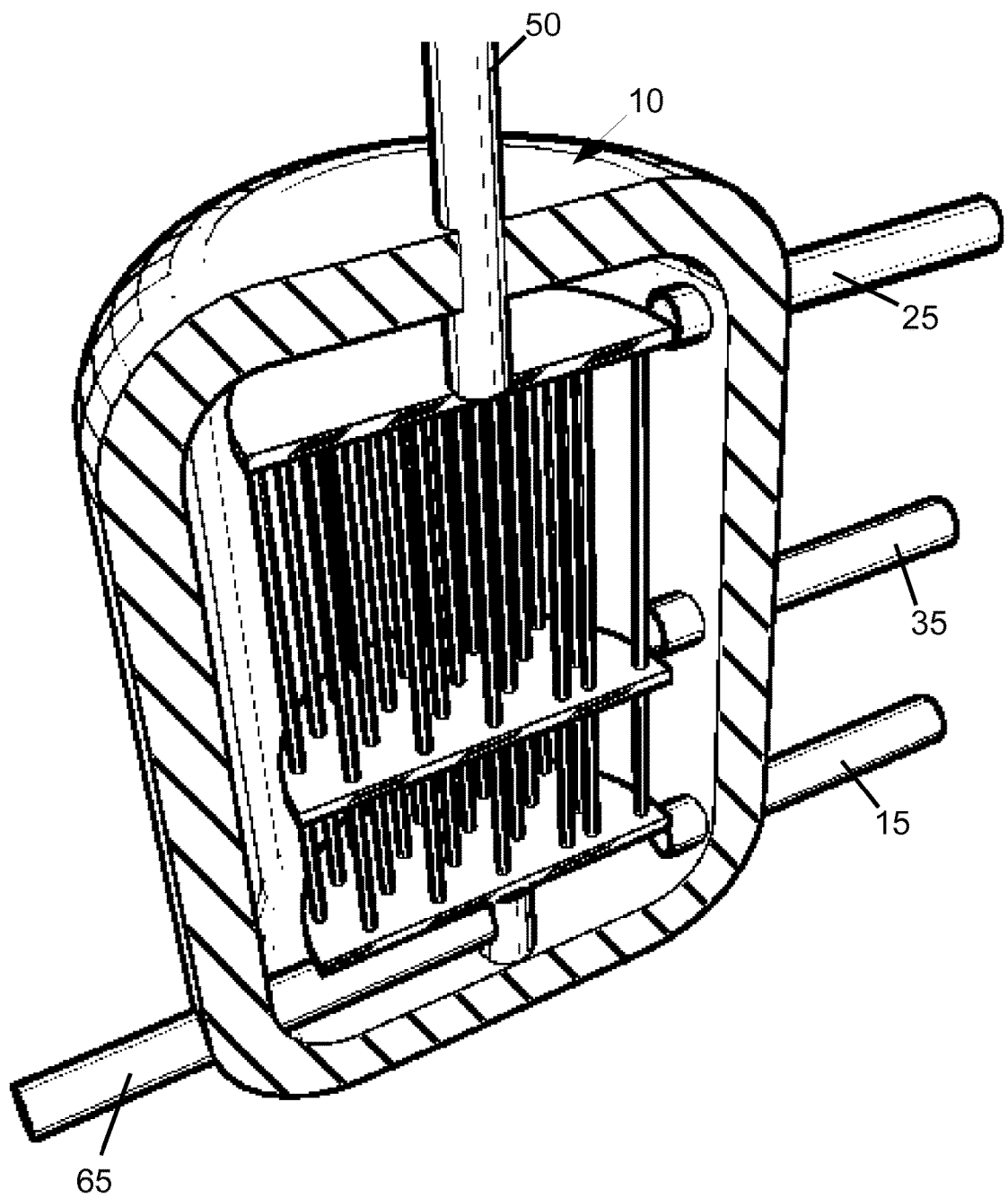
FIG. 12 is another cross-sectional view of a heat exchange tank having a plurality of vapor-vapor condensate containing pipes and a divider between a pre-warming section and a re-circulation section.
Figure 13:
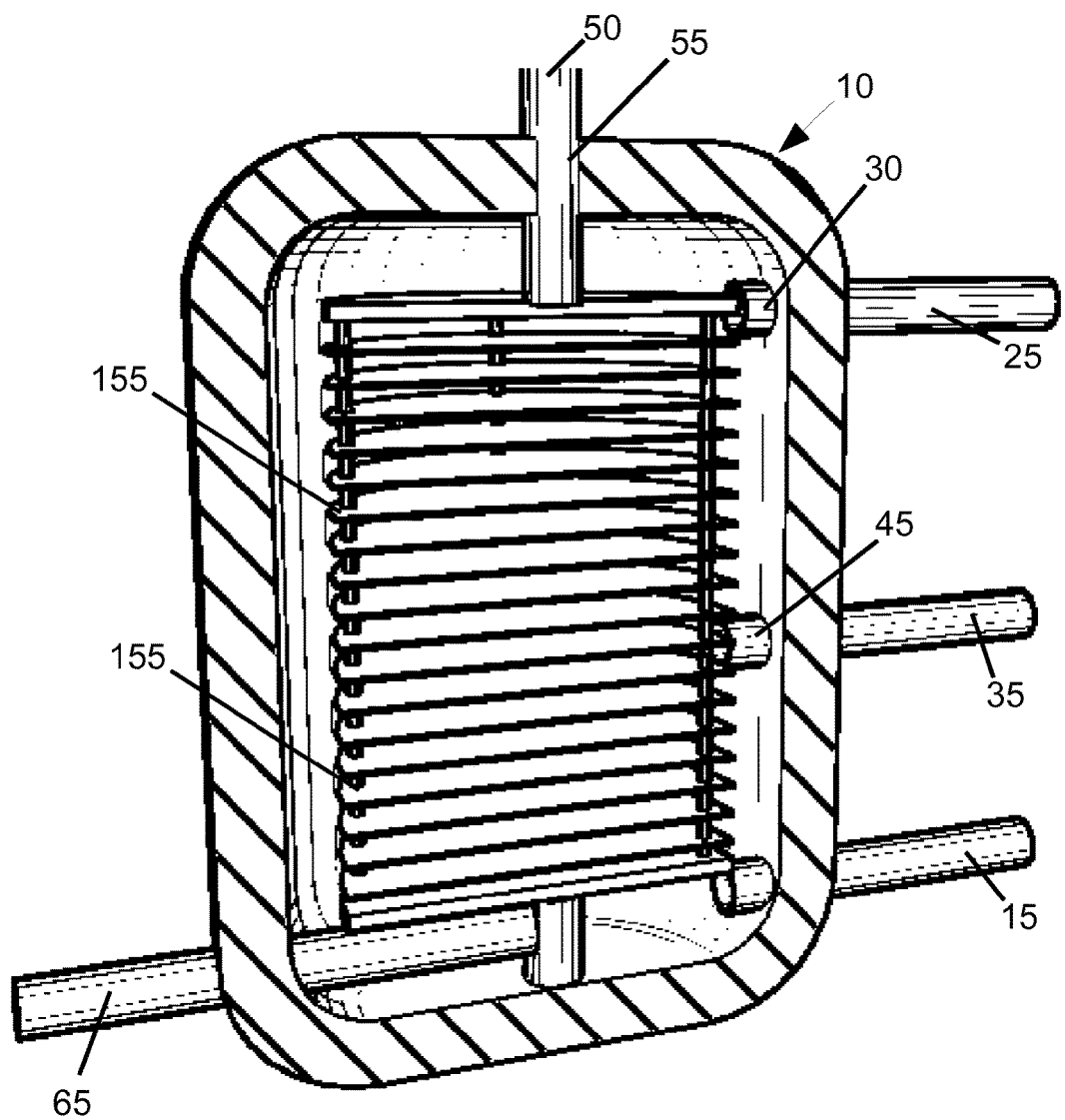
FIG. 13 is a cross-sectional view of a heat exchange tank having a plurality of horizontally oriented vapor-vapor condensate containing plates.
Figure 14:
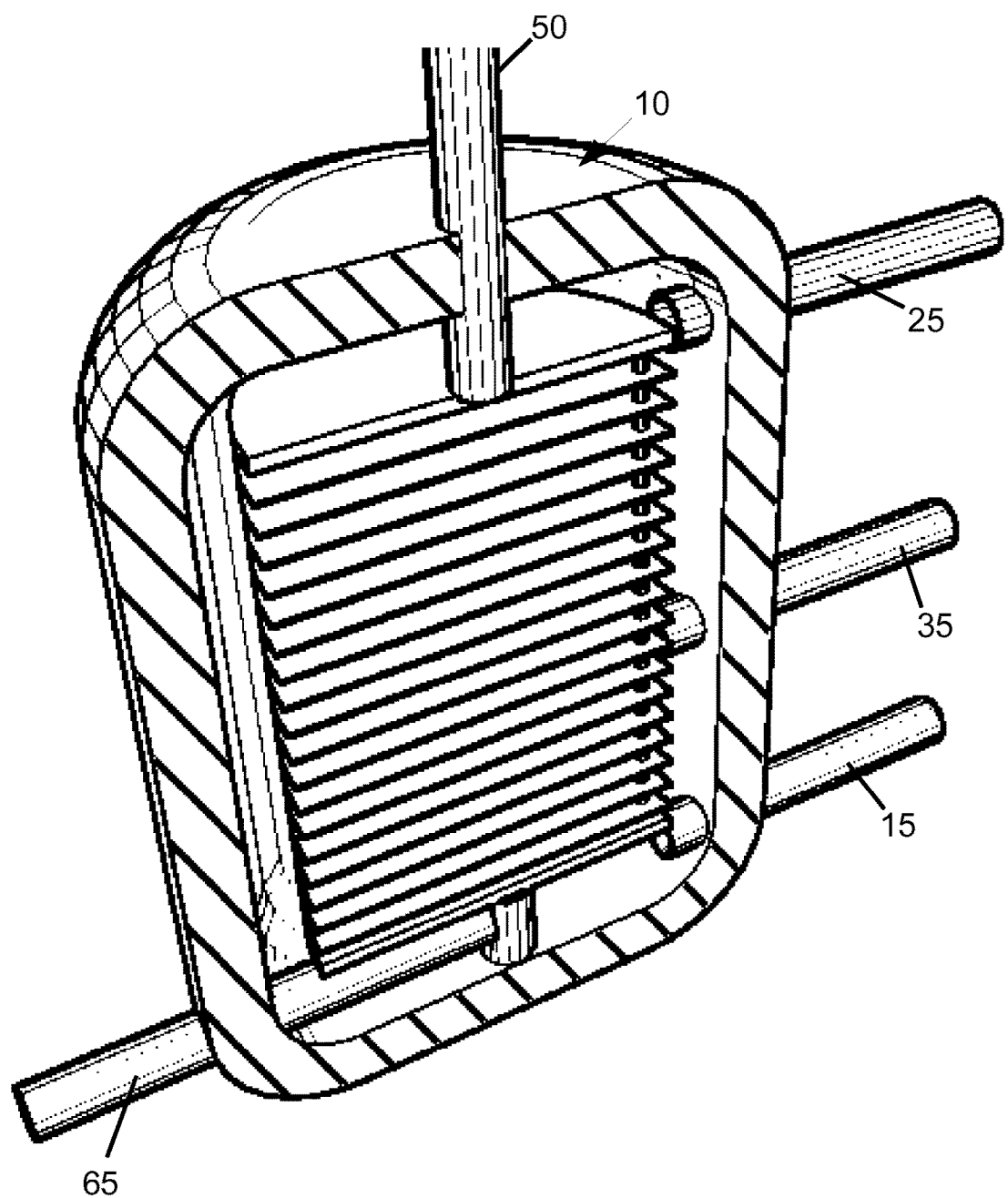
FIG. 14 is another cross-sectional view of a heat exchange tank having a plurality of horizontally oriented vapor-vapor condensate containing plates.
Figure 15:
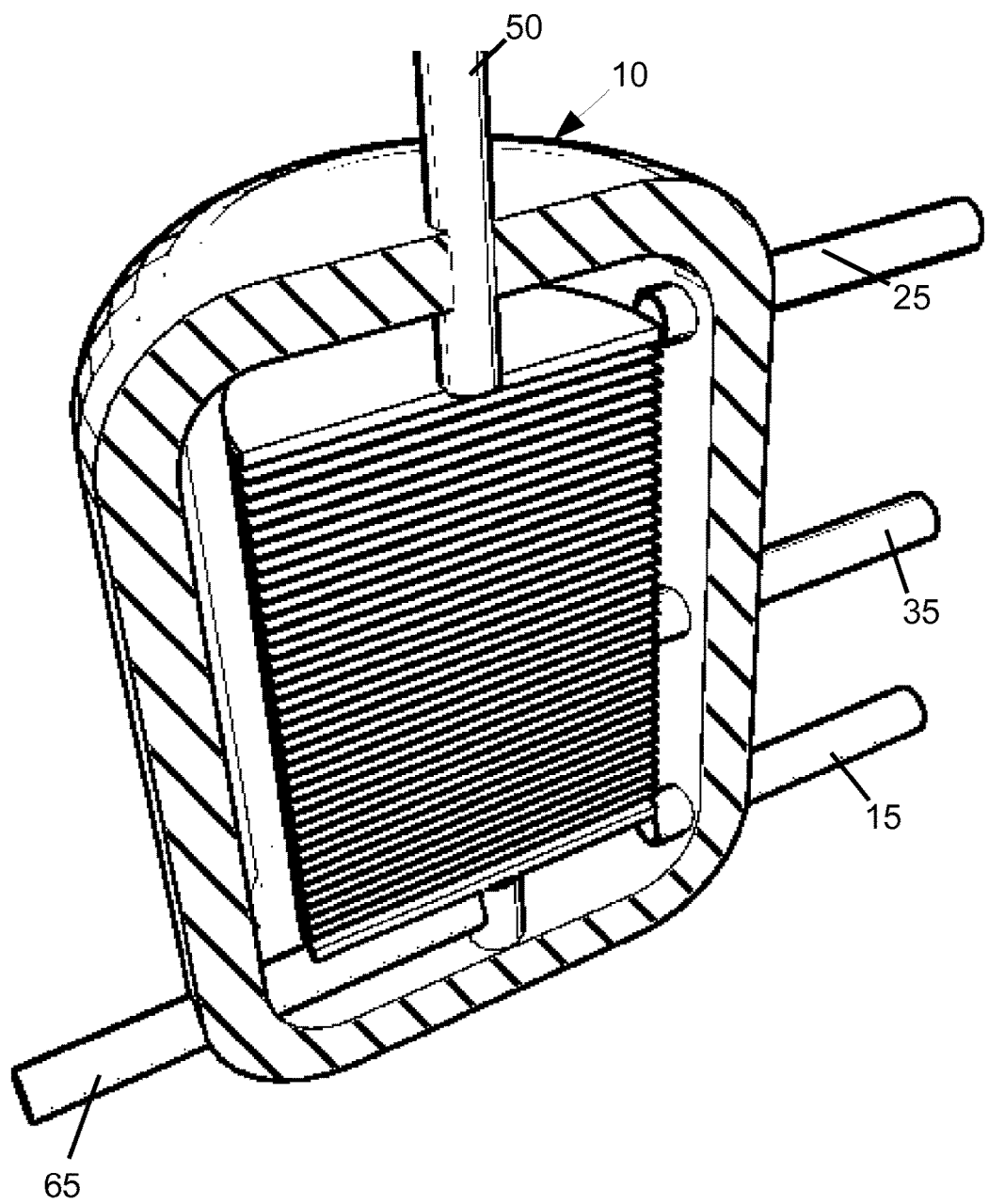
FIG. 15 is a cross-sectional view of a heat exchange tank having a plurality of densely packed horizontally oriented vapor-vapor condensate plates.
Figure 16:
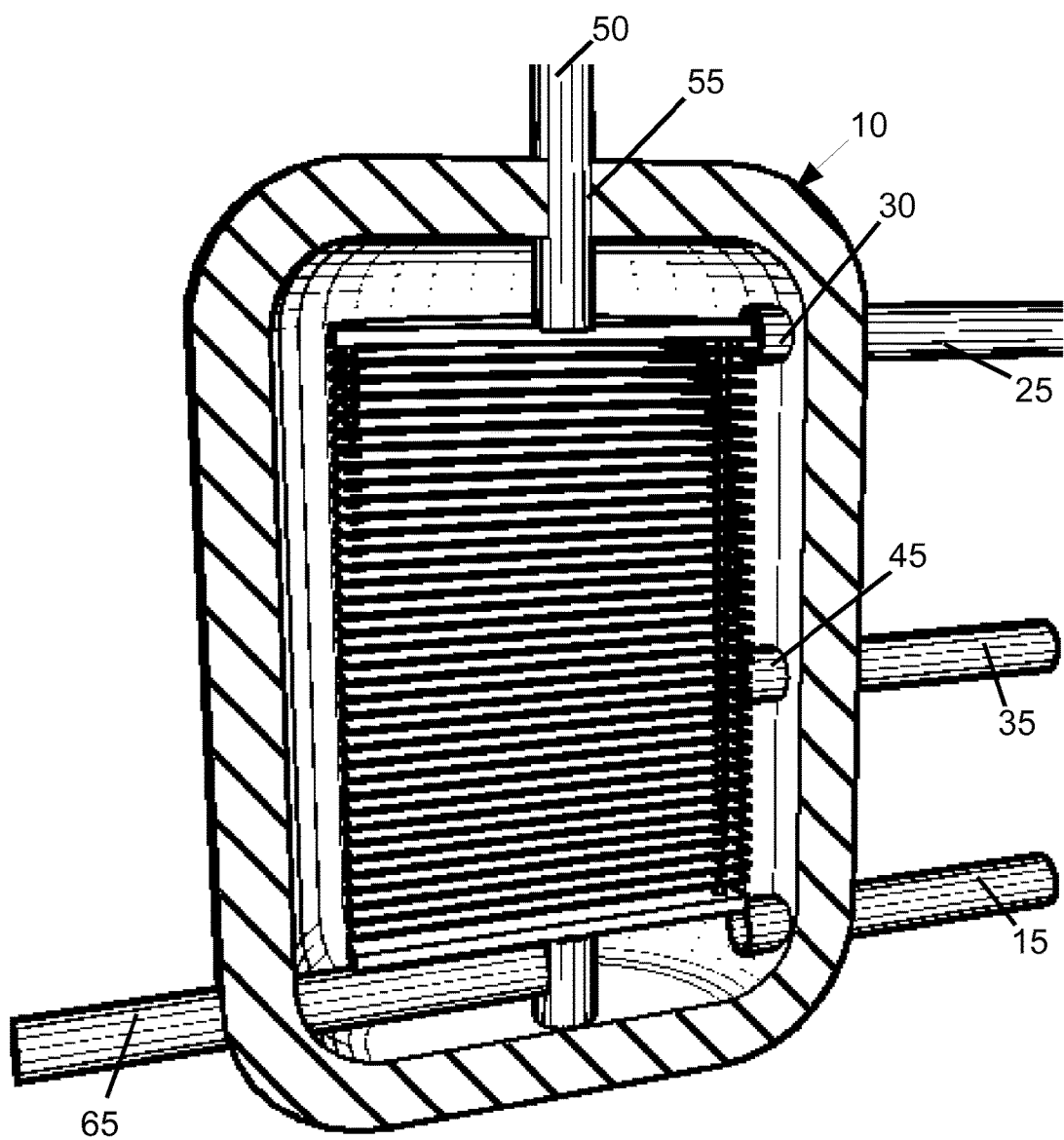
FIG. 16 is another cross-sectional view of a heat exchange tank having a plurality of densely packed horizontally oriented vapor-vapor condensate plates.

FIGS. 11 and 12 show perspective cross-sectional views of a heat exchange tank 10 with a section divider 150 between the pre-warming and re-circulation sections. The divider is structured to minimize the flow of heat energy from the re-circulation section to the pre-warming section while not hindering the replenishment of the re-circulation section when hot water is drawn out of the system. In the illustrated example a disk serves as the section divider, however other types of dividers may be utilized. For example, a wire mesh may be placed between the sections. The re-circulated water inlet 45 is substantially separated from the cool water inlet, the hot water inlet, the steam inlet, and the condensate outlet so that the pre-warming section and the re-circulation sections within the tank are similar in volume. The separation of the re-circulated water inlet also assists in preventing unnecessary heating of the condensate.

In the example illustrated in FIGS. 11 and 12, the water flowing through the water input line 15 has a temperature of 10° C. and a flow rate of 1.9 liters per second. The water leaving the heat exchanger tank through the water output line 25 has a temperature of 75° C. and a flow rate of 4.1 L/s. The water entering the heat exchanger tank from the re-circulation line 35 has a flow rate of 2.2 L/s and the temperature of the water close to the re-circulated water inlet has a temperature of 72° C. The temperature of the steam entering the tank through the steam input line is 250° C., and the condensate leaving the tank has an average temperature of 60° C.

FIGS. 13-16 illustrate cross-sectional views of heat exchange tanks where the steam within the tank travels through a plurality of horizontal plates 155 before leaving through the condensate outlet 65. The plates are structured so that the incoming and outgoing water circulates around the plates. The illustrated plates are horizontally oriented such that they do not substantially inhibit the horizontal circulation of the water while limiting the vertical water circulation. Limiting the vertical flow of water helps to maintain the pre-warming section of the tank at a lower temperature than the re-circulation section which improves the efficiency of the heat transfer. In the illustrated example, the water flowing through the water input line 15 has a temperature of 300 K and a flow rate of 2.0 liters per second. The water leaving the heat exchanger tank through the water output line 25 has a temperature of 350 K and a flow rate of 6.0 L/s. The water entering the heat exchanger tank from the re-circulation line 35 has a flow rate of 4.0 L/s and the temperature of the water close to the re-circulated water inlet has a temperature of 345 K. The temperature of the steam entering the tank through the steam input line is 525 K, and the condensate leaving the tank has an average temperature of 360 K.

Figure 17:
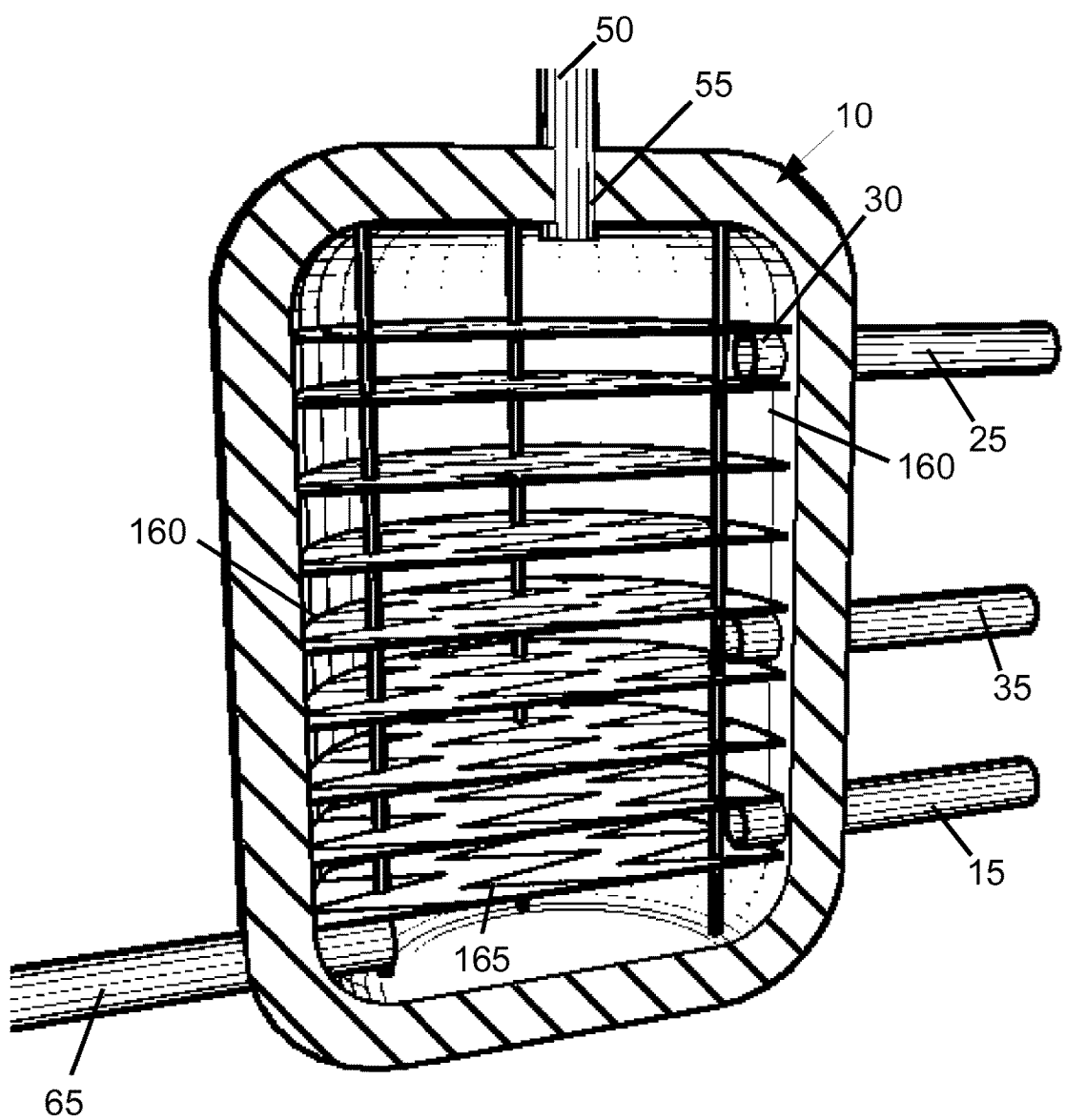
FIG. 17 is a cross-sectional view of a heat exchanger tank having a brazed plate construction where two fluids flow on alternating levels in opposite directions.
Figure 18:
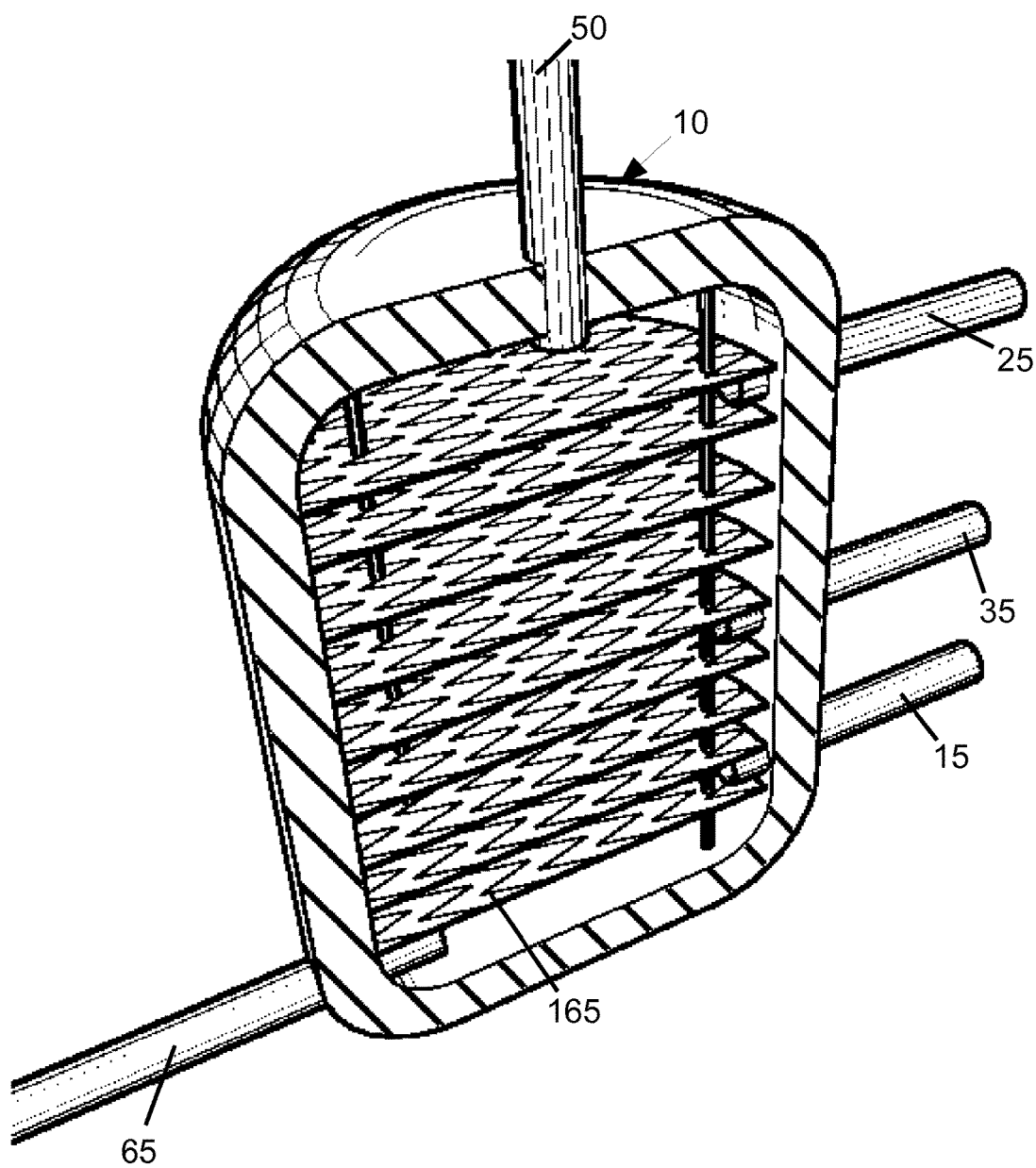
FIG. 18 is another cross-sectional view of a heat exchange tank having a brazed plate construction where two fluids flow on alternating levels in opposite directions.

FIGS. 17 and 18 illustrate an example of a brazed plate style heat exchanger where the steam and water flow in opposite directions on alternating levels 160 formed by the brazed plates. The brazed plates may have a non-smooth surface 165 adapted to increase the turbulence of the water and steam/steam condensate to thereby improve the efficiency of the heat transfer.

Although the heat exchanger system has been described in regards to heating water, the heat exchanger can also be used for radiant heating systems. In those instances, the fluid being warmed may include amounts of other substances such as glycol, sodium titrate, NOBURST® Hydronic System Cleaner, E-3 Defoaming Agent, and INHIBITOR BOOST. Other chemicals may also be added to the fluid to inhibit corrosion, prevent freezing, increase the boiling point of the fluid, inhibit the growth of mold and bacteria, and allow for improved leak detection (for example, dyes that fluoresce under ultraviolet light). Based on the fluid being warmed, the heat exchanger tank may be structured accordingly. For example, the pre-warming and re-circulation sections of the heat exchanger may be lined with a protective film if the warmed fluid is somewhat corrosive.

While the principles of the invention have been shown and described in connection with specific embodiments, it is to be understood that such embodiments are by way of example and are not limiting. Consequently, variations and modifications commensurate with the above teachings, and with the skill and knowledge of the relevant art, are within the scope of the present invention. The embodiments described herein are intended to illustrate best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

We claim:

1. A thermal energy transfer system for transferring heat energy between a first fluid and a second fluid, the system comprising:
    a first fluid circuit including an inlet, an outlet, and a middle portion in between, the first fluid circuit structured to allow the first fluid to flow from the first fluid circuit inlet to the first fluid circuit outlet;
    a second fluid circuit including an inlet, an outlet, and a middle portion in between, the second fluid circuit structured to allow the second fluid to flow from the second fluid circuit inlet to the second fluid circuit outlet;
    a heat exchanger wherein the middle portions of the first fluid and second fluid circuits extend and are in adjacent, thermally-conductive contact for facilitating heat transfer between the second fluid and the first fluid, the heat exchanger floodable in a determined proportion within a flooded one of the middle portions;
    a second fluid circuit control valve on the second fluid circuit downstream of the heat exchanger, for controlling a second fluid flow rate of the second fluid through the second fluid circuit, where the proportion of the heat exchanger that is flooded within the flooded one of the middle portions can be selectively calibrated; and
    a stabilization loop having a first inlet linked to the first fluid circuit between the heat exchanger and the first fluid circuit outlet, a outlet linked to the first fluid circuit between or at the heat exchanger and the first fluid circuit inlet, and a storage tank fluidly linked between the first inlet and the outlet.

2. The system of claim 1 further comprising a second inlet linked to the first fluid circuit between the outlet and the first circuit inlet, a portion of the first fluid flowing directly from the second inlet to the storage tank.

3. The system of claim 2 wherein the first fluid circuit includes a sub-circuit, apart from the circuit, from the second inlet to the outlet.

4. The system of claim 3 wherein the sub-circuit includes a diverter valve for attenuating the flow of the first fluid through the sub-circuit.

5. The system of claim 2 further comprising a bypass line secured to both the second inlet and the storage tank for transporting first fluid directly from the second inlet to the storage tank.

6. The system of claim 5 further comprising the first fluid circuit includes a sub-circuit, apart from the stabilization circuit, from the second inlet to the outlet, the sub-circuit includes a diverter valve for attenuating the flow of the first fluid through the sub-circuit, and the stabilization loop further includes a variable flow rate pump for pumping the first fluid from the first inlet to the outlet.

7. The system of claim 1 further comprising the stabilization loop further includes a variable flow rate pump for pumping the first fluid from the first inlet to the outlet.

8. The system of claim 1 further comprising a shutoff valve for the second fluid between the second fluid circuit inlet and the flooded heat exchanger unit for selectively stopping the flow of second fluid into the flooded heat exchanger unit and forming a low pressure region within the flooded heat exchanger; and the second fluid circuit control further includes a reverse flow mechanism for allowing the second fluid to be drawn back into the flooded heat exchanger unit towards the low pressure region.

9. The system of claim 1 further comprising the heat exchanger includes a plurality of condensate tubes.

10. The system of claim 1 further comprising a line extending between the first inlet and the storage tank for transporting first fluid from the first inlet to the storage tank, and a tank outlet line secured to both the outlet and the storage tank for transporting a pre-warmed first fluid from the storage tank to the outlet.

11. A stabilized heat exchange system for regulating the temperatures of both a first and second fluid leaving the heat exchange system, the system comprising:

a heat exchanger wherein the first and second fluids are in adjacent, thermally-conductive contact facilitating heat transfer from the second fluid to the first fluid to warm the first fluid from a warm temperature when entering the heat exchanger to a hot temperature, that is greater than the warm temperature, when exiting the heat exchanger;

the second fluid condensing from a gas to a liquid within the heat exchanger, wherein the relative proportions of the gas to the liquid within the heat exchanger are regulated by a second fluid control valve;

the second fluid control valve in a downstream flow of the second fluid from heat exchanger for controlling the flow rate of the second fluid through the heat exchanger, wherein the proportion of the heat exchanger that is flooded with the liquid can be selectively calibrated; and a circuit having a portion of first fluid exiting the heat exchanger with the hot temperature, recirculating back through a storage tank where the portion is admixed at first junction, in the storage tank, with the first fluid having a cool temperature that is less than the warm temperature, admixing at a second junction where the portion is again admixed with the first fluid having the cool temperature, and entering the heat exchanger with the warm temperature.

12. The system of claim 11 further comprising a first fluid inlet providing the first fluid at the cool temperature, a first cool fluid path extending from the first fluid inlet to the storage tank, and a second cool fluid path extending from the first fluid inlet to the second junction.

13. The system of claim 12 further comprising a diverter valve in the second cool fluid path restricting the flow of the first fluid through the second cool fluid path and diverting the first fluid to the storage tank via the first cool fluid path.

14. The system of claim 11 further comprising a variable flow rate pump pumping the portion of first fluid exiting the heat exchanger with the hot temperature to the storage tank.

15. The system of claim 11 wherein the second junction is located distant from the storage tank.

16. A thermal energy transfer system for transferring heat energy between a first fluid and a second fluid, the system comprising:

a first fluid circuit including an inlet, an outlet, and a middle portion in between, the first fluid circuit structured to allow the first fluid to flow from the first fluid circuit inlet to the first fluid circuit outlet;

a second fluid circuit including an inlet, an outlet, and a middle portion in between, the second fluid circuit structured to allow the second fluid to flow from the second fluid circuit inlet to the second fluid circuit outlet;

a heat exchanger wherein the middle portions of the first fluid and second fluid circuits extend and are in adjacent, thermally-conductive contact for facilitating heat transfer between the second fluid and the first fluid, the heat exchanger floodable in a determined proportion within a flooded one of the middle portions;

a second fluid circuit control valve on the second fluid circuit downstream of the heat exchanger, for controlling a second fluid flow rate of the second fluid through the second fluid circuit, where the proportion of the heat exchanger that is flooded within the flooded one of the middle portions can be selectively calibrated; and a loop having a first loop inlet linked to the first fluid circuit between the heat exchanger and the first fluid circuit outlet, a loop outlet linked to the first fluid circuit between or at the heat exchanger and the first fluid circuit inlet, and a tank fluidly linked between the first loop stabilization inlet and the loop outlet.

17. The system of claim 16 further comprising a portion of the first fluid flowing directly from the loop inlet to the tank.

18. The system of claim 16 wherein the loop further includes a variable flow rate pump for pumping the first fluid from the first loop inlet to the loop outlet.

19. The system of claim 16 wherein the heat exchanger includes a plurality of condensate tubes.

* * * * *